United States Patent
Kim et al.

(10) Patent No.: US 10,720,272 B2
(45) Date of Patent: Jul. 21, 2020

(54) FERRITE MAGNETIC MATERIAL AND FERRITE SINTERED MAGNET

(71) Applicant: UNION MATERIALS CORPORATION, Daegu (KR)

(72) Inventors: Min-Ho Kim, Gyeongsangbuk-do (KR); Dong-Young Lee, Gyeongsangbuk-do (KR); Jung-Hwan Lee, Gyeongsangbuk-do (KR)

(73) Assignee: UNION MATERIALS CORPORATION, Daegu (KR)

( * ) Notice: Subject to any disclaimer, the term of this patent is extended or adjusted under 35 U.S.C. 154(b) by 366 days.

(21) Appl. No.: 15/763,570

(22) PCT Filed: Sep. 1, 2016

(86) PCT No.: PCT/KR2016/009791
§ 371 (c)(1),
(2) Date: Mar. 27, 2018

(87) PCT Pub. No.: WO2017/065408
PCT Pub. Date: Apr. 20, 2017

(65) Prior Publication Data
US 2018/0277290 A1    Sep. 27, 2018

(30) Foreign Application Priority Data
Oct. 16, 2015    (KR) .................. 10-2015-0144516

(51) Int. Cl.
*H01F 1/11*    (2006.01)
*C04B 35/26*   (2006.01)
*H01F 41/02*   (2006.01)

(52) U.S. Cl.
CPC .............. *H01F 1/11* (2013.01); *C04B 35/265* (2013.01); *C04B 35/2633* (2013.01);
(Continued)

(58) Field of Classification Search
CPC ......... H01F 1/11; H01F 1/10; C04B 35/2633; C04B 35/2641
See application file for complete search history.

(56) References Cited

U.S. PATENT DOCUMENTS 5,846,449 A    12/1998  Taguchi et al.
6,139,766 A *  10/2000  Taguchi ............. C04B 35/2641
                                                252/62.57

FOREIGN PATENT DOCUMENTS

CN    104230323    * 12/2014
JP      3163279 B2    5/2001
(Continued)

OTHER PUBLICATIONS

Translation for CN 104230323, Dec. 24, 2014.*
(Continued)

*Primary Examiner* — C Melissa Koslow
(74) *Attorney, Agent, or Firm* — Harness, Dickey & Pierce, P.L.C.

(57) ABSTRACT

The present invention produces a ferrite magnetic material having a remarkably higher maximum energy product ($(BH)_{max}$) than a conventional ferrite magnetic material through the induction of a high saturation magnetization and a high anisotropic magnetic field by simultaneously adding Co and Zn to substitute some of Fe and adjusting the content ratio of Zn/Co. In addition, the present invention can produce a desired magnetic material at a lower cost than a conventional CaLaCo-based ferrite magnetic material substituted with only Co by using Zn, which is relatively at least seven times cheaper than Co, together with Co.

15 Claims, 2 Drawing Sheets

(52) U.S. Cl.
CPC .. *C04B 35/2641* (2013.01); *C04B 2235/3208* (2013.01); *C04B 2235/3213* (2013.01); *C04B 2235/3227* (2013.01); *C04B 2235/3275* (2013.01); *C04B 2235/3284* (2013.01); *C04B 2235/5445* (2013.01); *C04B 2235/767* (2013.01); *C04B 2235/77* (2013.01); *C04B 2235/785* (2013.01); *H01F 41/0266* (2013.01)

(56) References Cited

FOREIGN PATENT DOCUMENTS

| | | |
|---|---|---|
| JP | 2012-209295 A | 10/2012 |
| KR | 10-0538874 B1 | 12/2005 |
| KR | 10-2009-0010175 A | 1/2009 |
| KR | 10-0910048 B1 | 7/2009 |
| KR | 10-1082389 B1 | 11/2011 |
| KR | 10-2012-0047245 A | 5/2012 |
| KR | 10-2013-0128484 A | 11/2013 |
| KR | 10-2013-0130766 A | 12/2013 |

OTHER PUBLICATIONS

Extended European Search Report, dated May 31, 2019, issued in European Patent Application No. EP 16855625.

International Search Report from corresponding PCT Application No. PCT/KR2016/009791 dated Dec. 8, 2016, and it's English translation.

\* cited by examiner

FERRITE MAGNETIC MATERIAL AND FERRITE SINTERED MAGNET

CROSS-REFERENCE TO RELATED APPLICATIONS

This application is a national phase application of PCT Application No. PCT/KR2016/009791, filed on 1 Sep. 2016 which claims priority to Korean Patent Application No. 10-2015-0144516, filed 16 Oct. 2015. The entire disclosures of the applications identified in this paragraph are incorporated herein by reference.

TECHNICAL FIELD

The present invention relates to a ferrite magnetic material capable of providing a high maximum energy product $((BH)_{max})$ and a sintered ferrite magnet using the same.

BACKGROUND ART

A ferrite has a magnetoplumbite-type (or M-type) crystal structure in the composition of $AO \cdot nFe_2O_3$ (wherein A is a divalent metal ion, Sr or Ba). Since a ferrite is a material whose magnetic properties are not easily changed by the direction and magnitude of a magnetic field, it is commonly used as a material for permanent magnets to be employed in automobile electric motors, rotors for electric devices, and so on. In the meantime, it has been recently demanded that motors become smaller in size and more efficient due to environmental problems and various laws and regulations related to energy saving in accordance therewith, and permanent magnets are also required to have higher performance.

An M-type ferrite is characterized by uniaxial magnetocrystalline anisotropy among the essential requirements for a magnet material and contains twelve (12) iron ions per molecule as represented by its chemical formula of $SrFe_{12}O_{19}$ or $BaFe_{12}O_{19}$. The magnetic properties of an M-type ferrite are based on the magnetic moments of Fe ions. There are eight (8) upward spin directions and four (4) downward spin directions among the twelve (12) Fe ions, and the sum of the net spins per molecule for an M-type ferrite is four (4). In general, the iron ions in an M-type ferrite are trivalent ($Fe^{3+}$) and have five (5) 3d electrons (i.e., spin magnetic moments). Thus, the twenty (20) spin magnetic moments (i.e., 5 spin moments×sum of the net spins) serve as the source of magnetism (i.e., saturation magnetization) of an M-type ferrite magnet. That is, in the case where some of the iron ions are substituted with either a non-magnetic element or an element having a spin magnetic moment lower than that of the iron ions in the downward spin direction of the iron ions for the purpose of improving the saturation magnetization value, which is the source of magnetism, the total spin magnetic moments are increased, resulting in an improvement in the saturation magnetization. In general, examples of the element having a spin magnetic moment lower than that of an iron ion include $Co^{2+}$ (spin moment=3), $Ni^{2+}$ (spin moment=2), $Cu^{2+}$ (spin moment=1), and so on. The non-magnetic element is, for example, $Zn^{2+}$ (spin moment=0). It is well known that if iron ions ($Fe^{3+}$) are substituted with $Zn^{2+}$, the total spin magnetic moments are increased to the maximum in theory, thereby producing a high saturation magnetization. Although Zn is capable of producing a high saturation magnetization, however, it has a low anisotropic magnetic field. Therefore, since Zn has a low coercive force value, it is difficult for Zn to be employed in permanent magnets.

In addition, in order to improve the magnetocrystalline anisotropy, which is one of the crucial magnetic properties of a permanent magnet, some of the iron ions in an M-type ferrite are substituted with an element having a high magnetocrystalline anisotropy, thereby producing a high anisotropic magnetic field.

The representative magnetic properties of a permanent magnet include residual magnetic flux density (Br), intrinsic coercive force (iHc), maximum energy product $((BH)_{max})$, and squareness ratio (Hknie/iHc). The intrinsic coercive force (iHc) and the residual magnetic flux density (Br) meet the following relationships:

$Br=4\pi Is \times \rho \times f$ (Is: saturation magnetization; $\rho$: density; and $f$: degree of orientation)

$iHc=H_A \times fc$ ($H_A$: anisotropic magnetic field; and $fc$: volume ratio of single magnetic domains).

The residual magnetic flux density (Br) is proportional to the saturation magnetization, which is the sum of the spin magnetic moments of a composition, the density, and the degree of orientation. The density and the degree of orientation are physical properties materialized after fine pulverization in the process for preparing a ferrite. The residual magnetic flux density can be attained up to about 95% of the theoretical value (about 4,500 G) by process optimization. The theoretical value of the saturation magnetization for strontium ferrite (hereinafter referred to as "Sr-ferrite") at room temperature is known to be 74 emu/g ($4\pi Is$=4,760 G, when the density and the degree of orientation are 100%, respectively). The saturation magnetization is increased by an increase in the spin magnetic moments in a substituted ferrite composition.

The intrinsic coercive force (iHc) is proportional to the anisotropic magnetic field and the volume ratio of single magnetic domains. It is known that the theoretical value of the anisotropic magnetic field for a single magnetic domain of Sr-ferrite is 20,000 Oe and that the crystal size of a single magnetic domain is about 1 μm. A high coercive force value can be achieved by increasing the volume ratio of single magnetic domains by process optimization after fine pulverization in the process for preparing a ferrite. It is possible to achieve about 40% (7,700 Oe) of the theoretical value due to the internal demagnetizing field when an Sr-ferrite is in the size of a single magnetic domain, and a higher anisotropic magnetic field value can be achieved by substituting some of Fe ions with an element having a high magnetic anisotropy. However, since the anisotropic magnetic field and the saturation magnetization have a trade-off relation according to the equation $H_A=2K_1/Is$ ($2K_1$: anisotropy coefficient), it is theoretically impossible to increase the saturation magnetization and the anisotropic magnetic field at the same time by a simple substitution of an element.

In the meantime, the maximum energy product $((BH)_{max})$ is the product of the magnetization (B) provided by a magnet and the magnetic field (H) acting on the magnet at each operating point on BH curves, which stands for the energy accumulated inside the magnet. On each demagnetization curve, the point at which the product of B and H is a maximum represents the maximum energy product. In general, a permanent magnet having high Br, iHc, and squareness ratio values has a high maximum energy product $((BH)_{max})$. A motor applied the permanent magnet has a high output and a low demagnetization caused by an external magnetic field. As a result, the maximum energy product is a representative performance index of a permanent magnet.

For example, U.S. Pat. No. 5,846,449 (Patent Document 1) discloses that in the case where some of Fe is substituted with Zn and some of Sr is substituted with La, a ferrite magnet having an improved saturation magnetization is obtained as compared with the conventional compositions in which some of Fe is substituted with Co. However, the ferrite magnet in which some of Fe is substituted with Zn involves a problem that the maximum energy product is lowered to 5.14 MGOe due to an abrupt decrease in the an isotropic magnetic field.

In addition, Korean Patent No. 0910048 (Patent Document 2) discloses a technique of improving the residual magnetic flux density and the intrinsic coercive force by way of substituting some of Ca with a rare earth element such as La and substituting some of Fe with Co, thereby producing a maximum energy product of 42.0 kJ/m$^3$ (or about 5.28 MGOe). However, there is a problem that the magnetic properties of a magnet obtained in accordance with Patent Document 2 are not sufficiently high as compared with the conventional Sr-ferrite magnets (Patent Document 1).

Furthermore, Korean Patent No. 1082389 (Patent Document 3) discloses a method of obtaining high residual magnetic flux density, intrinsic coercive force, and squareness ratio values by way of substituting some of Ca with Sr, Ba, and La, and substituting some of Fe with Co and Cr. However, the maximum energy product of a magnet obtained by this method is 5.29 MGOe, which is not sufficiently high as compared with the conventional Sr-ferrite magnets (Patent Document 1). In addition, this method has a disadvantage in that a complicated sintering process is employed in order to obtain high magnetic properties, resulting in an increase in the manufacturing cost.

As described above, the ferrite magnetic materials of known compositions still have unsatisfactory magnetic properties. Accordingly, there has been a continued demand for a magnetic material that has excellent magnetic properties as compared with the conventional magnetic materials, to thereby meet the recent requirements such as high performance, high efficiency, miniaturization, and light weight of rotors and sensors used in automobiles, electric devices, and home appliances.

DETAILED DESCRIPTION

Technical Problem

Accordingly, an object of the present invention is to provide a ferrite magnetic material, which is inexpensive and capable of providing a high maximum energy product through a high saturation magnetization and a high anisotropic magnetic field, and a sintered ferrite magnet obtained by sintering the same.

Solution to Problem

In order to achieve the above object, the present invention provides a ferrite magnetic material, which comprises a primary phase of a magnetoplumbite phase having a hexagonal structure, wherein the element constituting the primary phase comprises a composition represented by the following Formula 1:

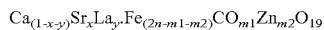
[Formula 1]

wherein $0.335 \leq m2/m1 \leq 0.8$,
$0.25 \leq m1+m2 \leq 0.35$,
$0.92 \leq 1-x \leq 0.97$,
$1.0 \leq (1-x-y)/y \leq 1.15$,
$1.0 \leq 1-x+m2 \leq 1.1$, and
$9.0 \leq 2n \leq 10.0$.

Advantageous Effects of Invention

The sintered ferrite magnet obtained from the ferrite magnetic material according to the present invention has a high maximum energy product ($(BH)_{max}$), which can meet the recent demand for a motor that is highly efficient and smaller in size. In addition, according to the present invention, it is possible to reduce the cost of raw materials by using inexpensive raw materials without increasing the process cost by using a conventional process for preparing sintered ferrite magnets.

BEST MODE FOR CARRYING OUT THE INVENTION

Figure 1:
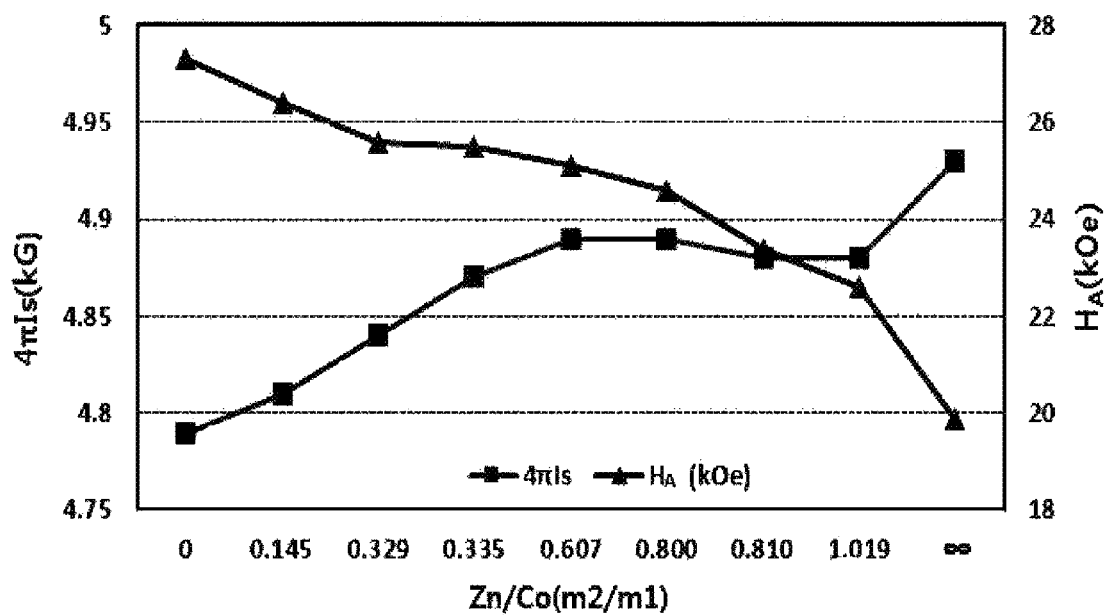
FIG. 1 is a graph showing the change in each of the saturation magnetization ($4\pi Is$) and the anisotropic magnetic field ($H_A$) with respect to a change in the content ratio of Zn/Co of the sintered ferrite magnet obtained in Preparation Example 1.

As a result of continued research to achieve the above object, the present inventors have discovered a ferrite magnetic material capable of providing a high maximum energy product by virtue of a high saturation magnetization and a high anisotropic magnetic field by way of limiting the substitute elements and their ranges that can improve the saturation magnetization and the anisotropic magnetic field at the same time in a ferrite composition comprising Ca, La, and Co, whereby the present inventors have completed the present invention.

In the present invention, a ferrite magnetic material capable of providing a significantly high maximum energy product ($(BH)_{max}$) as compared with the conventional ferrite magnetic materials has been prepared by way of simultaneously adding Co and Zn in order to substitute some of Fe and adjusting the content ratio of Co/Zn to 0.335 to 0.80, to thereby induce a high saturation magnetization and a high anisotropic magnetic field. In addition, the present invention can provide a desired magnetic material at a lower cost than that of the conventional CaLaCo-type ferrite magnetic material substituted with Co only by way of employing Zn and Co together, wherein Zn is relatively cheaper than Co by 7 times.

The ferrite magnetic material of the present invention comprises a primary phase of a magnetoplumbite phase having a hexagonal structure, wherein the element constituting the primary phase comprises a composition represented by the following Formula 1:

$$Ca_{(1-x-y)}Sr_xLa_yFe_{(2n-m1-m2)}Co_{m1}Zn_{m2}O_{19}.$$ [Formula 1]

When the content ratio of Zn/Co (i.e., m2/m1) is in the range of 0.335 to 0.8, a high saturation magnetization and a high anisotropic magnetic field can be obtained, whereby a high maximum energy product can be obtained. If the content ratio of Zn/Co (m2/m1) is within the above range, it is possible to prevent the problems that a high maximum energy product cannot be obtained due to a decrease in the saturation magnetization caused by an increase in the amount of Co substitution; and that a high maximum energy product cannot be obtained due to an abrupt decrease in the anisotropic magnetic field without a large increase in the saturation magnetization caused by an excessive content of solid solution of Zn.

When the sum of the contents of Ca and La (i.e., 1−x) is in the range of 0.92 to 0.97, it is possible to obtain a high maximum energy product. If the sum of the contents of Ca and La (1−x) is within the above range, it is possible to prevent the problems that the saturation magnetization and the anisotropic magnetic field are reduced at the same time due to a decrease in the content of substitutional solid solution of La and Ca; and that the maximum energy product is reduced since a non-magnetized phase is generated due to large amounts of La and Ca and the phase becomes unstable at certain sintering temperatures.

When the content ratio of Ca/La (i.e., (1−x−y)/y) is in the range of 1.0 to 1.15, it is possible to obtain a high maximum energy product. If the content ratio of Ca/La ((1−x−y)/y) is within the above range, it is possible to obtain a sufficient saturation magnetization and a sufficient anisotropic magnetic field and to prevent the problem that the maximum energy product is reduced since a non-magnetized phase is generated due to a large amount of Ca and the saturation magnetization and the anisotropic magnetic field are reduced at the same time.

When the sum of the contents of Co and Zn (i.e., m1+m2) is in the range of 0.25 to 0.35, it is possible to obtain a high maximum energy product. If the sum of the contents of Co and Zn (m1+m2) is within the above range, it is possible to prevent the problems that a high maximum energy product cannot be obtained due to decreases in the saturation magnetization and in the anisotropic magnetic field at the same time caused by a decrease in the content of substitutional solid solution; and that the maximum energy product is reduced since the saturation magnetization and the anisotropic magnetic field are reduced at the same time due to the generation of a non-magnetized phase caused by an excessive content of substitutional solid solution and, in turn, a failure of substitution for Fe.

When the sum of the contents of La, Ca, and Zn (i.e., 1−x+m2) is in the range of 1.0 to 1.1, it is possible to obtain a high maximum energy product. If the sum of the contents of La, Ca, and Zn (1−x+m2) is within the above range, it is possible to prevent the problems that the maximum energy product is reduced since the saturation magnetization and the anisotropic magnetic field are reduced due to a lack of the content of substitutional solid solution of each element; and that the maximum energy product is reduced since the anisotropic magnetic field is particularly reduced due to an excessive content of solid solution of each element.

2n is a value that stands for the content ratio of (Fe+Co+Zn)/(Ca+Sr+La). When 2n is in the range of 9.0 to 10.0, a high maximum magnetic energy potential is obtained. If 2n is within the above range, it is possible to prevent the problems that the maximum energy product is reduced since a non-magnetized phase is generated due to large amounts of Ca, Sr, and La and, in turn, an excessive content of solid solution thereof; and that the maximum energy product is reduced since unreacted α-$Fe_2O_3$ is generated.

Specifically, the values of m1 and m2 in Formula 1 above may satisfy the conditions of 0.3≤m1+m2≤0.34 and 0.6≤m2/m1≤0.7.

The values of x and y in Formula 1 above may satisfy the conditions of 0.95≤1−x≤0.965 and 1.05≤(1−x−y)/y≤1.10.

The values of x and m2 in Formula 1 above may satisfy the condition of 1.03≤1−x+m2≤1.06.

The value of 2n in Formula 1 above may satisfy the condition of 9.3≤2n≤9.4.

The ferrite magnetic material may have an average particle diameter of 0.6 to 0.8 μm.

The process for preparing a ferrite magnetic material and a sintered magnet according to an embodiment of the present invention is as follows.

<Mixing Process>

First, the starting materials are weighed according to their weight percentages as calculated from a predetermined ratio of each element. The starting materials are generally wet mixed using a wet-type ball mill or a wet-type attritor, in which they are uniformly and sufficiently mixed for 5 to 10 hours in case of a wet-type ball mill or 2 to 4 hours in case of a wet-type attritor. As the starting materials, $SrCO_3$, $CaCO_3$, $La_2O_3$, $Fe_2O_3$, $Co_3O_4$, CoO, ZnO, and so on may be used. In order to facilitate the ferritization reaction and uniform the growth of the particles at a low calcining temperature at the time of calcination, 0.05 to 0.2 part by weight of $H_3BO_3$, based on 100 parts by weight of the starting materials, may be further mixed with the starting materials.

<Calcination Process>

The calcination process is a process in which the starting materials of the composition blended and mixed in the previous step are subjected to calcination to produce a calcined product having an M-type (i.e., magnetoplumbite-type) structure together with the ferritization reaction. Usually, the calcination is carried out in an oxidizing atmosphere in the air. It is preferred that the calcination is carried out in a temperature range of 1,150 to 1,250° C. for 30 minutes to 2 hours. The longer the calcination time is, the higher the M-phase ratio is. But this leads to an increase in the manufacturing cost. The proportion of the M-phase, which is the primary phase of the calcined product, is preferably 90% or more, and the particle size in the structure is preferably 2 to 4 μm.

<Coarse Pulverization Process>

Since the state of the calcined product upon the calcination is generally in the form of a granule or a clinker, the calcined product may be coarsely pulverized. The coarse pulverization may be carried out using a dry-type vibration mill or a dry-type ball mill, among which the dry-type vibration mill is preferred. The average particle diameter of the coarse powder upon the coarse pulverization may be 2 to 4 μm.

<Fine Pulverization Process>

When the average particle diameter of the fine powder is 0.6 to 0.8 μm in the fine pulverization process, it is possible to produce sufficient magnetic properties. If the average particle diameter of the fine powder is within the above range, it is possible to prevent the problems that the orientation is lowered due to an agglomeration of the ferrite magnetic powder, which deteriorates the magnetic properties; that the time for dewatering is increased due to a leakage of the slurry at the time of pressing, which increases the manufacturing cost; that multiple magnetic domains are generated, thereby abruptly reducing the coercive force; and that a large amount of heat energy is required to secure a sufficient sintered density, which increases the manufacturing cost.

The fine pulverization may be carried out using a wet-type ball mill or a wet-type attritor. The pulverization time is inversely proportional to the pulverization energy and varies with the type of the pulverizer. Thus, the pulverization time may be adjusted depending on the pulverizer and the target particle diameter.

In addition, in order to control the growth and restraint of the particles during the sintering and to control the particle diameter of the crystal grains, $SiO_2$, $CaCO_3$, or a mixture thereof may be added as an additive during the fine pulverization. In order to facilitate the substitution effect and to control the particle growth during the sintering, $Fe_2O_3$, $La_2O_3$, $SrCO_3$, ZnO, or CoO may be added as an additive during the fine pulverization. In such event, if the amount of the additives is too small, the intended effect is insignificant. If the amount of the additives is excessive, an adverse effect is produced. Thus, each of the additives may be added in an amount ranging from 0.1 to 10 parts by weight based on 100 parts by weight of the pulverized powder.

Further, a dispersant may be added in order to improve the fluidity of the slurry during the pressing in a magnetic field, to lower the viscosity, and to enhance the orientation effect. Although both an aqueous dispersant and a non-aqueous dispersant may be used as the dispersant, an aqueous dispersant is preferably used in view of the environmental aspects during the preparation process. As the aqueous dispersant, an organic compound having a hydroxyl group and a carboxyl group, sorbitol, calcium gluconate, or the like may be used. The dispersant may be added in an amount ranging from 0.1 to 1.0 part by weight based on 100 parts by weight of the coarse powder. If the amount of the dispersant is within the above range, it is possible to prevent the problem that cracks are generated during the drying and sintering of a green body due to a decrease in the dewaterability.

<Pressing Process>

The pressing process may be carried out by a wet-type anisotropic pressing method. In the pressing process, a pressure is applied for molding while a magnetic field is applied, whereby a green body for a sintered anisotropic magnet is obtained.

As an example of the wet-type anisotropic pressing, the slurry upon the fine pulverization is subjected to dewatering and concentration, and it is then maintained at a certain concentration and is subjected to pressing in a magnetic field. The dewatering and concentration may be carried out using a centrifugal separator or a filter press. In such event, the slurry concentration may be 60 to 66% by weight, the pressing pressure may be 0.3 to 0.5 ton/cm$^2$, and the applied magnetic field may be 10 to 20 kOe.

The green body thus obtained has a residual water content of about 10 to 15% by weight. If the green body with the residual water is subjected to the sintering process, cracks may be generated in the course of dewatering while the temperature is raised. Thus, in order to prevent this, the green body may be naturally dried or dried at a low temperature of, e.g., 50 to 100° C. in the atmosphere and then sintered.

<Drying and Sintering Processes>

In general, the green body is dried and sintered in sequence in an oxidizing atmosphere in the air to produce a sintered ferrite magnet. For the purpose of removing water and dispersants remaining in the green body, the green body may be subjected to dewatering and degreasing at 50 to 100° C.

The magnetic properties of sintered ferrite magnets can be enhanced by controlling the sintering conditions such as heating rate, maximum temperature, maintaining time at the maximum temperature, cooling rate, and so on. For example, the magnetic properties can be controlled by way of adjusting the sintering conditions (e.g., sintering time, heating rate, maximum temperature, and maintaining time at the maximum temperature), whereby the content of solid solution of the substitute elements in the crystal grains of sintered ferrite magnets is increased, the crystal grain growth is controlled, the particle size is uniformly maintained, the density of the sintered magnet is controlled, and the degree of orientation of the sintered product is controlled. The green body may be sintered for 30 minutes to 2 hours under the conditions of a heating rate of 1 to 10° C./min and a sintering maximum temperature of 1,150 to 1,250° C., and then cooled at a cooling rate of 1 to 10° C./min.

The sintered magnetoplumbite-type ferrite magnet of the present invention prepared in the manner as described above has a maximum energy product ($(BH)_{max}$) of 5.6 MGOe or more, while the saturation magnetization ($4\pi Is$) is 4.85 kG or more and the anisotropic magnetic field ($H_A$) is 24.5 kOe or more in the first quadrant of the $4\pi I$—H curve. In addition, the sintered ferrite magnet may have an average density of 5.1 to 5.2 g/cm$^3$.

The $4\pi I$—H curve relates to magnetization, which indicates an operation of generating a magnetic moment and a magnetic polarization by applying a magnetic field to a magnetic product. It represents the characteristics inside the magnet (i.e., inherent to the magnet).

In addition, the present invention provides a segment-type permanent magnet derived from the ferrite magnetic material of the present invention through a segment mold. The segment-type permanent magnet can be advantageously used in various products such as rotors, sensors, and the like for automobiles, electric devices, and home appliances.

DETAILED DESCRIPTION

Hereinafter, the present invention is explained in more detail by the following examples. But the following Examples are intended to further illustrate the present invention without limiting its scope thereto.

EXAMPLE

Reference Example: Measurement of Magnetic Properties and Density

The sintered ferrite magnets prepared in the preparation example below were each measured for the maximum energy product ($(BH)_{max}$) using a B—H Curve Tracer with a maximum applied magnetic field of 15 kOe (or 1,200 kA/m) at 20° C. in the atmosphere. In addition, the sintered ferrite magnets were each cut to a width of 5 mm and a thickness of 5 mm, which was then measured for the saturation magnetization ($4\pi Is$) and the anisotropic magnetic field ($H_A$) in the first quadrant of the $4\pi I$—H curve. The density of the ferrite magnet was measured by the Archimedes method.

Preparation Example 1

Preparation Example 1-1: Mixing Process

Ferric oxide ($Fe_2O_3$ in a purity of 99% or more), strontium carbonate ($SrCO_3$), calcium carbonate ($CaCO_3$), lanthanum oxide ($La_2O_3$), cobalt oxide (CoO), and zinc oxide (ZnO) were used as starting materials. These starting materials were blended so as to produce a ferrite magnet of $Ca_{(1-x-y)}Sr_xLa_y \cdot Fe_{(2n-m1-m2)}Co_{m1}Zn_{m2}O_{19}$, which satisfies the composition shown in Table 1 below. In order to facilitate the ferrite reaction, 0.1% by weight of $H_3BO_3$ was added to the blended raw materials based on the total weight thereof. The blended raw materials were mixed with water to a concentration of 40% by weight, followed by wet circulation mixing for 2 hours. The raw materials thus obtained were dried at 130° C. for 24 hours.

TABLE 1

| Sample No. | Ca (1 − x − y)) | Sr (x) | La (y) | Fe (2n − m1 − m2) | Co (m1) | Zn (m2) | 2n | Ca/La ((1 − x − y)/y) |
|---|---|---|---|---|---|---|---|---|
| 1 | 0.474 | 0.064 | 0.462 | 9.344 | 0.315 | 0 | 9.659 | 1.03 |
| 2 | 0.474 | 0.064 | 0.462 | 9.344 | 0.275 | 0.040 | 9.659 | 1.03 |
| 3 | 0.474 | 0.064 | 0.462 | 9.343 | 0.237 | 0.078 | 9.658 | 1.03 |
| 4 | 0.474 | 0.064 | 0.462 | 9.343 | 0.236 | 0.079 | 9.658 | 1.03 |
| 5 | 0.474 | 0.064 | 0.462 | 9.343 | 0.196 | 0.119 | 9.658 | 1.03 |
| 6 | 0.474 | 0.064 | 0.462 | 9.343 | 0.175 | 0.140 | 9.658 | 1.03 |
| 7 | 0.474 | 0.064 | 0.462 | 9.343 | 0.174 | 0.142 | 9.658 | 1.03 |
| 8 | 0.474 | 0.064 | 0.462 | 9.343 | 0.156 | 0.159 | 9.658 | 1.03 |
| 9 | 0.474 | 0.064 | 0.462 | 9.342 | 0 | 0.315 | 9.657 | 1.03 |

Preparation Example 1-2: Calcination Process

The powder dried in Preparation Example 1-1 was calcined at 1,200° C. for 30 minutes in the atmosphere to obtain a calcined product.

Preparation Example 1-3: Coarse Pulverization and Fine Pulverization Processes The calcined product of Preparation Example 1-2 was pulverized into a coarse powder having an average particle diameter of 4 μm using a dry-type vibration mill. In order to finely pulverize the coarsely pulverized powder, the coarsely pulverized powder and water were charged to a circulation-type attritor such that the concentration of the coarsely pulverized powder was 40% by weight. Further, 10% by weight of $Fe_2O_3$, 1.7% by weight of $CaCO_3$, 0.45% by weight of $SiO_2$, 1.5% by weight of $La_2O_3$, and 0.6% by weight of calcium gluconate were added thereto (based on the total amount of the coarsely pulverized powder) to obtain a composition for a sintered product as shown in Table 1 above. The average particle diameter of the powder upon the fine pulverization was adjusted to be 0.65 μm.

Preparation Example 1-4: Pressing Process

The slurry, which was a mixture of the finely pulverized powder and water as obtained in Preparation Example 1-3, was dewatered such that the concentration of the finely pulverized powder was 63% by weight. It was then made to a pressed product sample in the form of a disk (a diameter of 40 mm×a thickness of 11 mm) using a wet-type magnetic field press, in which the magnetic field was applied in the direction parallel to the direction of pressing. In such event, the magnetic field intensity was set to 10 kOe (or 796 kA/m), and the pressing pressure was set to 0.4 ton/cm².

Preparation Example 1-5: Sintering Process

The green body obtained in Preparation Example 1-4 was sintered at 1,210° C. for 1 hour, and the sintered product thus obtained was processed to a thickness of 7 mm using a double-side thickness processing machine to thereby obtain a sintered ferrite magnet.

Figure 2:
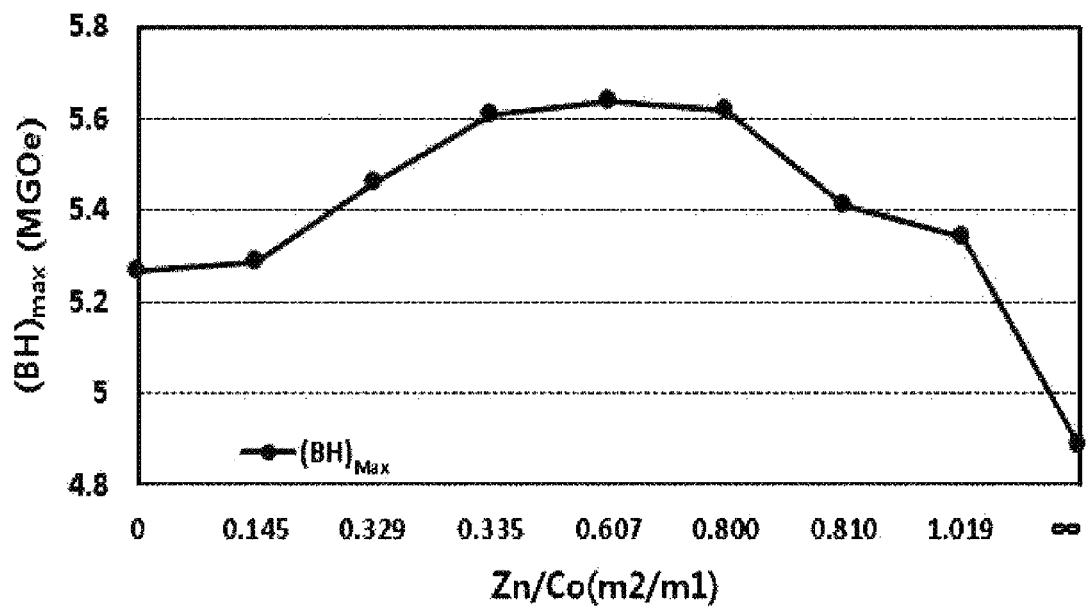
FIG. 2 is a graph showing the change in the maximum energy product ($(BH)_{max}$) with respect to a change in the content ratio of Zn/Co of the sintered ferrite magnet obtained in Preparation Example 1.
Figure 3:
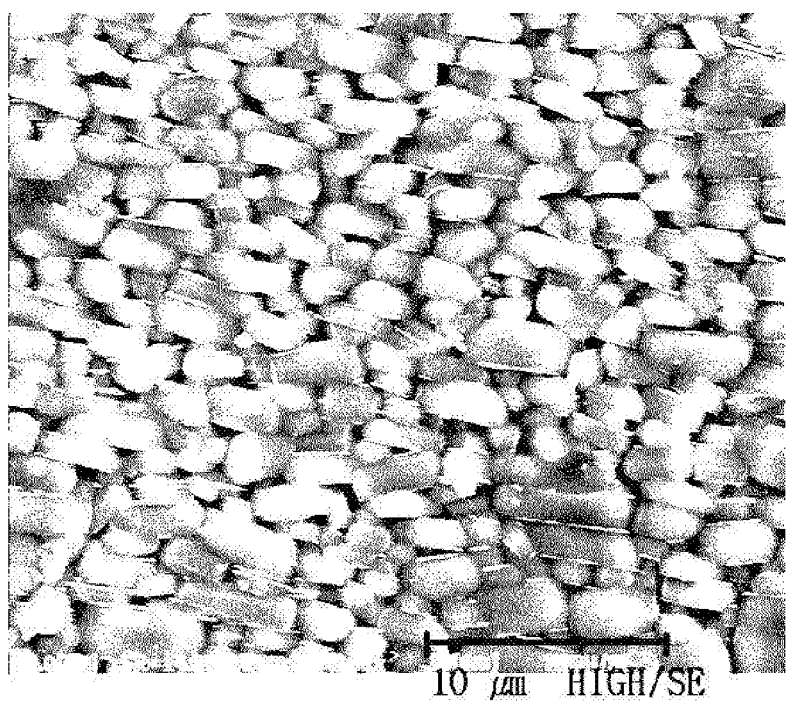
FIG. 3 is a scanning electron microscope (SEM) photograph of a plane parallel to the axial direction of the sintered ferrite magnet prepared from Sample 4 of Preparation Example 1.

The sintered ferrite magnets thus obtained were each measured for the magnetic properties and the density. The results are shown in Table 2 below. The changes in the saturation magnetization (4πIs) and in the anisotropic magnetic field ($H_A$) with respect to a change in the content ratio of Zn/Co of the sintered ferrite magnets are shown in FIG. 1. The change in the maximum magnetic energy ($(BH)_{max}$) is shown in FIG. 2. A scanning electron microscope (SEM) photograph of a plane parallel to the axial direction of the sintered ferrite magnet prepared from Sample 4 of Preparation Example 1 is shown in FIG. 3.

TABLE 2

| Sample No. | Zn/Co (m2/m1) | Co + Zn (m1 + m2) | Ca + La (1 − x) | Ca + La + Zn (1 − x + m2) | Density (g/cm³) | 4πIs (kG) | $H_A$ (kOe) | $(BH)_{max}$ (MGOe) |
|---|---|---|---|---|---|---|---|---|
| 1 | 0 | 0.315 | 0.936 | 0.936 | 5.097 | 4.79 | 27.3 | 5.27 |
| 2 | 0.145 | 0.315 | 0.936 | 0.976 | 5.101 | 4.81 | 26.4 | 5.29 |
| 3 | 0.329 | 0.315 | 0.936 | 1.014 | 5.097 | 4.84 | 25.6 | 5.46 |
| 4 | 0.335 | 0.315 | 0.936 | 1.015 | 5.104 | 4.87 | 25.5 | 5.61 |
| 5 | 0.607 | 0.315 | 0.936 | 1.055 | 5.115 | 4.89 | 25.1 | 5.64 |
| 6 | 0.800 | 0.315 | 0.936 | 1.076 | 5.117 | 4.89 | 24.6 | 5.62 |
| 7 | 0.810 | 0.315 | 0.936 | 1.077 | 5.110 | 4.88 | 23.4 | 5.41 |
| 8 | 1.019 | 0.315 | 0.936 | 1.095 | 5.107 | 4.88 | 22.6 | 5.34 |
| 9 | ∞ | 0.315 | 0.936 | 1.251 | 5.099 | 4.93 | 19.9 | 4.89 |

As shown in Table 2, Samples 1 to 3 and 7 to 9 are the Comparative Examples of the present invention, and Samples 4 to 6 are the Examples of the present invention. When the content ratio of Zn/Co (i.e., m2/m1) was in the range of 0.335 to 0.800, the maximum energy product $((BH)_{max})$ was 5.6 MGOe or more, which was significantly higher than that of the Comparative Examples whose content ratio of Zn/Co (m2/m1) fell outside the above range.

In addition, there was a certain range of the content ratio of Zn/Co (m2/m1), in which the anisotropic magnetic field was not abruptly decreased while $4\pi Is$ was increased. When the content ratio of Zn/Co (m2/m1) exceeded the above range, the anisotropic magnetic field was abruptly decreased, which lowered the maximum energy product. When the content ratio of Zn/Co (m2/m1) was less than the above range, $4\pi Is$ was decreased, whereby a high maximum energy product was not obtained.

Preparation Example 2

Sintered ferrite magnets were produced in the same manner as in Preparation Example 1, except that the composition ratio of Ca, Sr, and La was changed as shown in Table 3 below.

TABLE 3

| Sample No. | Ca (1 − x − y) | Sr (x) | La (y) | Fe (2n − m1 − m2) | Co (m1) | Zn (m2) | 2n | Ca/La ((1 − x − y)/y) |
|---|---|---|---|---|---|---|---|---|
| 10 | 0.514 | 0 | 0.486 | 9.344 | 0.236 | 0.080 | 9.660 | 1.06 |
| 11 | 0.506 | 0.016 | 0.478 | 9.344 | 0.236 | 0.080 | 9.660 | 1.06 |
| 12 | 0.500 | 0.030 | 0.470 | 9.344 | 0.236 | 0.080 | 9.660 | 1.06 |
| 13 | 0.490 | 0.040 | 0.470 | 9.344 | 0.236 | 0.080 | 9.660 | 1.04 |
| 14 | 0.466 | 0.080 | 0.454 | 9.344 | 0.236 | 0.080 | 9.660 | 1.03 |
| 15 | 0.443 | 0.119 | 0.438 | 9.344 | 0.236 | 0.080 | 9.660 | 1.01 |
| 16 | 0.419 | 0.159 | 0.422 | 9.344 | 0.236 | 0.080 | 9.660 | 0.99 |

The sintered ferrite magnets thus obtained were each measured for the magnetic properties and the density. The results are shown in Table 4 below.

TABLE 4

| Sample No. | Zn/Co (m2/m1) | Co + Zn (m1 + m2) | Ca + La (1 − x) | Ca + La + Zn (1 − x + m2) | Density (g/cm³) | $4\pi Is$ (kG) | $H_A$ (kOe) | $(BH)_{max}$ (MGOe) |
|---|---|---|---|---|---|---|---|---|
| 10 | 0.339 | 0.316 | 1.000 | 1.080 | 5.111 | 4.82 | 24.6 | 5.19 |
| 11 | 0.339 | 0.316 | 0.984 | 1.064 | 5.107 | 4.82 | 25.2 | 5.38 |
| 12 | 0.339 | 0.316 | 0.970 | 1.050 | 5.110 | 4.87 | 25.3 | 5.62 |
| 13 | 0.339 | 0.316 | 0.960 | 1.040 | 5.101 | 4.88 | 25.2 | 5.64 |
| 14 | 0.339 | 0.316 | 0.920 | 1.000 | 5.098 | 4.87 | 25.3 | 5.62 |
| 15 | 0.339 | 0.316 | 0.881 | 0.961 | 5.094 | 4.84 | 25.0 | 5.43 |
| 16 | 0.339 | 0.316 | 0.841 | 0.921 | 5.095 | 4.83 | 25.0 | 5.40 |

As shown in Table 4, Samples 10, 11, 15, and 16 are the Comparative Examples of the present invention, and Samples 12 to 14 are the Examples of the present invention. When the sum of the contents of Ca and La (i.e., 1−x) was in the range of 0.92 to 0.97, the maximum energy product $((BH)_{max})$ was 5.6 MGOe or more. When the sum of the contents of Ca and La (1−x) exceeded 0.97, the maximum energy product was reduced due to an increase in the phase instability and a decrease in the saturation magnetization. When it was less than 0.92, the content of substitutional solid solution of Co and Zn was not sufficient, which lowered $4\pi Is$, whereby a maximum energy product as required in the present invention was not obtained.

Preparation Example 3

Sintered ferrite magnets were produced in the same manner as in Preparation Example 1, except that the sum of the contents of Co and Zn (i.e., m1+m2) was changed as shown in Table 5 below.

TABLE 5

| Sample No. | Ca (1 − x − y) | Sr (x) | La (y) | Fe (2n − m1 − m2) | Co (m1) | Zn (m2) | 2n | Ca/La ((1 − x − y)/y) |
|---|---|---|---|---|---|---|---|---|
| 17 | 0.478 | 0.062 | 0.460 | 9.378 | 0.157 | 0.053 | 9.588 | 1.04 |
| 18 | 0.478 | 0.062 | 0.460 | 9.376 | 0.171 | 0.058 | 9.605 | 1.04 |
| 19 | 0.478 | 0.062 | 0.460 | 9.366 | 0.187 | 0.063 | 9.616 | 1.04 |
| 20 | 0.478 | 0.062 | 0.460 | 9.366 | 0.205 | 0.069 | 9.640 | 1.04 |
| 21 | 0.478 | 0.062 | 0.460 | 9.366 | 0.227 | 0.077 | 9.670 | 1.04 |
| 22 | 0.474 | 0.064 | 0.462 | 9.342 | 0.248 | 0.084 | 9.674 | 1.03 |
| 23 | 0.475 | 0.064 | 0.461 | 9.352 | 0.262 | 0.088 | 9.702 | 1.03 |
| 24 | 0.475 | 0.064 | 0.461 | 9.342 | 0.269 | 0.091 | 9.702 | 1.03 |
| 25 | 0.475 | 0.064 | 0.461 | 9.338 | 0.294 | 0.099 | 9.731 | 1.03 |

The sintered ferrite magnets thus obtained were each measured for the magnetic properties and the density. The results are shown in Table 6 below.

TABLE 6

| Sample No. | Zn/Co (m2/m1) | Co + Zn (m1 + m2) | Ca + La (1 − x) | Ca + La + Zn (1 − x + m2) | Density (g/cm$^3$) | $4\pi Is$ (kG) | $H_A$ (kOe) | $(BH)_{max}$ (MGOe) |
|---|---|---|---|---|---|---|---|---|
| 17 | 0.338 | 0.210 | 0.938 | 0.991 | 5.089 | 4.80 | 23.8 | 5.15 |
| 18 | 0.339 | 0.229 | 0.938 | 0.996 | 5.093 | 4.82 | 24.3 | 5.34 |
| 19 | 0.337 | 0.250 | 0.938 | 1.001 | 5.104 | 4.86 | 25.3 | 5.60 |
| 20 | 0.337 | 0.274 | 0.938 | 1.007 | 5.101 | 4.87 | 25.1 | 5.62 |
| 21 | 0.339 | 0.304 | 0.938 | 1.015 | 5.105 | 4.88 | 25.2 | 5.63 |
| 22 | 0.339 | 0.332 | 0.936 | 1.020 | 5.106 | 4.88 | 25.2 | 5.65 |
| 23 | 0.336 | 0.350 | 0.936 | 1.024 | 5.110 | 4.88 | 25.0 | 5.61 |
| 24 | 0.338 | 0.360 | 0.936 | 1.027 | 5.109 | 4.84 | 24.3 | 5.28 |
| 25 | 0.337 | 0.393 | 0.936 | 1.035 | 5.115 | 4.80 | 23.6 | 5.11 |

As shown in Table 6, Samples 17, 18, 24, and 25 are the Comparative Examples of the present invention, and Samples 19 to 23 are the Examples of the present invention. When the sum of the contents of Co and Zn (m1+m2) was in the range of 0.25 to 0.35, the maximum energy product $((BH)_{max})$ was 5.6 MGOe or more. When the sum of the contents of Co and Zn (m1+m2) was less than 0.25, the saturation magnetization and the anisotropic magnetic field were reduced at the same time due to a decrease in the content of substitutional solid solution, whereby a high maximum energy product was not obtained. When the sum of the contents of Co and Zn (m1+m2) exceeded 0.35, the saturation magnetization and the anisotropic magnetic field were reduced at the same time due to the generation of a non-magnetized phase caused by an excessive content of substitutional solid solution and, in turn, a failure of substitution for Fe ions, whereby the maximum energy product was reduced.

Preparation Example 4

Sintered ferrite magnets were produced in the same manner as in Preparation Example 1, except that the sum of the contents of Ca, La, and Zn (i.e., 1−x+m2) was changed as shown in Table 7 below.

TABLE 7

| Sample No. | Ca (1 − x − y) | Sr (x) | La (y) | Fe (2n − m1 − m2) | Co (m1) | Zn (m2) | 2n | Ca/La ((1 − x − y)/y) |
|---|---|---|---|---|---|---|---|---|
| 26 | 0.471 | 0.079 | 0.450 | 9.442 | 0.188 | 0.064 | 9.694 | 1.05 |
| 27 | 0.467 | 0.075 | 0.458 | 9.385 | 0.219 | 0.075 | 9.679 | 1.02 |
| 28 | 0.507 | 0.052 | 0.441 | 9.434 | 0.237 | 0.083 | 9.754 | 1.15 |
| 29 | 0.478 | 0.060 | 0.462 | 9.343 | 0.201 | 0.119 | 9.663 | 1.03 |
| 30 | 0.498 | 0.035 | 0.467 | 9.351 | 0.188 | 0.135 | 9.674 | 1.07 |
| 31 | 0.495 | 0.032 | 0.473 | 9.408 | 0.195 | 0.145 | 9.748 | 1.05 |

The sintered ferrite magnets thus obtained were each measured for the magnetic properties and the density. The results are shown in Table 8 below.

TABLE 8

| Sample No. | Zn/Co (m2/m1) | Co + Zn (m1 + m2) | Ca + La (1 − x) | Ca + La + Zn (1 − x + m2) | Density (g/cm$^3$) | $4\pi Is$ (kG) | $H_A$ (kOe) | $(BH)_{max}$ (MGOe) |
|---|---|---|---|---|---|---|---|---|
| 26 | 0.340 | 0.252 | 0.921 | 0.985 | 5.099 | 4.84 | 24.8 | 5.44 |
| 27 | 0.342 | 0.294 | 0.925 | 1.000 | 5.105 | 4.88 | 25.4 | 5.62 |
| 28 | 0.350 | 0.320 | 0.948 | 1.031 | 5.104 | 4.88 | 25.1 | 5.63 |
| 29 | 0.592 | 0.320 | 0.940 | 1.059 | 5.114 | 4.89 | 24.8 | 5.63 |
| 30 | 0.718 | 0.323 | 0.965 | 1.100 | 5.117 | 4.89 | 24.7 | 5.60 |
| 31 | 0.744 | 0.340 | 0.968 | 1.113 | 5.115 | 4.87 | 23.5 | 5.38 |

As shown in Table 8, Samples 26 and 31 are the Comparative Examples of the present invention, and Samples 27 to 30 are the Examples of the present invention. When the sum of the contents of Ca, La, and Zn (1−x+m2) was in the range of 1.0 to 1.1, the maximum energy product (($BH)_{max}$) was 5.6 MGOe or more. When the sum of the contents of Ca, La, and Zn (1−x+m2) was less than 1.0, the saturation magnetization and the anisotropic magnetic field were reduced due to a lack of the content of substitutional solid solution of each element, which lowered the maximum energy product. Further, when the sum of the contents of Ca, La, and Zn (1−x+m2) exceeded 1.1, the anisotropic magnetic field was reduced due to an excessive content of solid solution of each element, whereby the maximum energy product was reduced.

Preparation Example 5

Sintered ferrite magnets were produced in the same manner as in Preparation Example 1, except that 2n was changed as shown in Table 9 below.

TABLE 9

| Sample No. | Ca (1 − x − y) | Sr (x) | La (y) | Fe (2n − m1 − m2) | Co (m1) | Zn (m2) | 2n | Ca/La ((1 − x − y)/y) |
|---|---|---|---|---|---|---|---|---|
| 32 | 0.472 | 0.064 | 0.464 | 8.581 | 0.238 | 0.081 | 8.900 | 1.02 |
| 33 | 0.472 | 0.064 | 0.464 | 8.685 | 0.238 | 0.081 | 9.004 | 1.02 |
| 34 | 0.473 | 0.064 | 0.463 | 8.995 | 0.237 | 0.080 | 9.312 | 1.02 |
| 35 | 0.475 | 0.063 | 0.462 | 9.430 | 0.235 | 0.079 | 9.744 | 1.03 |
| 36 | 0.476 | 0.063 | 0.461 | 9.686 | 0.235 | 0.079 | 10.000 | 1.03 |
| 37 | 0.476 | 0.063 | 0.461 | 9.856 | 0.234 | 0.079 | 10.169 | 1.03 |

The sintered ferrite magnets thus obtained were each measured for the magnetic properties and the density. The results are shown in Table 10 below.

TABLE 10

| Sample No. | Zn/Co (m2/m1) | Co + Zn (m1 + m2) | Ca + La (1 − x) | Ca + La + Zn (1 − x + m2) | Density (g/cm$^3$) | $4\pi Is$ (kG) | $H_A$ (kOe) | $(BH)_{max}$ (MGOe) |
|---|---|---|---|---|---|---|---|---|
| 32 | 0.340 | 0.319 | 0.936 | 1.017 | 5.127 | 4.84 | 24.3 | 5.31 |
| 33 | 0.340 | 0.319 | 0.936 | 1.017 | 5.120 | 4.88 | 25.0 | 5.62 |
| 34 | 0.338 | 0.317 | 0.936 | 1.016 | 5.116 | 4.88 | 25.3 | 5.63 |
| 35 | 0.336 | 0.314 | 0.937 | 1.016 | 5.111 | 4.87 | 25.5 | 5.62 |
| 36 | 0.336 | 0.314 | 0.937 | 1.016 | 5.100 | 4.87 | 24.9 | 5.60 |
| 37 | 0.338 | 0.313 | 0.937 | 1.016 | 5.091 | 4.83 | 23.0 | 5.32 |

As shown in Table 10, when 2n was in the range of 9.0 to 10.0, the maximum energy product $(BH)_{max}$ was 5.6 MGOe or more. When 2n was less than 9.0, all of the elements except Fe were relatively increased and the content of substitutional solid solution was excessive, such that the saturation magnetization and the anisotropic magnetic field were reduced, which lowered the maximum energy product. Further, when 2n exceeded 10.0, the saturation magnetization and the anisotropic magnetic field were reduced due to the effect of unreacted $\alpha\text{-Fe}_2\text{O}_3$, which lowered the maximum energy product.

Preparation Example 6

Sintered ferrite magnets were produced in the same manner as in Preparation Example 1, except that the content ratio of Ca/La (i.e., (1−x−y)/y) was changed as shown in Table 11 below.

TABLE 11

| Sample No. | Ca (1 − x − y) | Sr (x) | La (y) | Fe (2n − m1 − m2) | Co (m1) | Zn (m2) | 2n | Ca/La ((1 − x − y)/y) |
|---|---|---|---|---|---|---|---|---|
| 38 | 0.461 | 0.064 | 0.475 | 9.342 | 0.236 | 0.08 | 9.658 | 0.97 |
| 39 | 0.469 | 0.064 | 0.467 | 9.343 | 0.236 | 0.08 | 9.659 | 1.00 |
| 40 | 0.480 | 0.064 | 0.456 | 9.344 | 0.236 | 0.08 | 9.660 | 1.05 |
| 41 | 0.491 | 0.064 | 0.445 | 9.345 | 0.236 | 0.08 | 9.661 | 1.10 |
| 42 | 0.501 | 0.064 | 0.435 | 9.347 | 0.236 | 0.08 | 9.663 | 1.15 |
| 43 | 0.511 | 0.064 | 0.425 | 9.348 | 0.236 | 0.08 | 9.664 | 1.20 |

The sintered ferrite magnets thus obtained were each measured for the magnetic properties and the density. The results are shown in Table 12 below.

TABLE 12

| Sample No. | Zn/Co (m2/m1) | Co + Zn (m1 + m2) | Ca + La (1 − x) | Ca + La + Zn (1 − x + m2) | Density (g/cm³) | 4πIs (kG) | $H_A$ (kOe) | $(BH)_{max}$ (MGOe) |
|---|---|---|---|---|---|---|---|---|
| 38 | 0.339 | 0.316 | 0.936 | 1.016 | 5.115 | 4.84 | 24.8 | 5.41 |
| 39 | 0.339 | 0.316 | 0.936 | 1.016 | 5.115 | 4.87 | 25.1 | 5.61 |
| 40 | 0.339 | 0.316 | 0.936 | 1.016 | 5.113 | 4.88 | 25.3 | 5.63 |
| 41 | 0.339 | 0.316 | 0.936 | 1.016 | 5.112 | 4.88 | 25.4 | 5.64 |
| 42 | 0.339 | 0.316 | 0.936 | 1.016 | 5.108 | 4.88 | 25.3 | 5.61 |
| 43 | 0.339 | 0.316 | 0.936 | 1.016 | 5.103 | 4.82 | 24.6 | 5.33 |

As shown in Table 11, Samples 38 and 43 are the Comparative Examples of the present invention, and Samples 39 to 42 are the Examples of the present invention.

As shown in Table 12, when the content ratio of Ca/La ((1−x−y)/y) was in the range of 1.0 to 1.15, the maximum energy product $(BH)_{max}$ was 5.6 MGOe or more. When the content ratio of Ca/La ((1−x−y)/y) was less than 1.0, the saturation magnetization and the anisotropic magnetic field were not sufficient, which lowered the maximum energy product. When the content ratio of Ca/La ((1−x−y)/y) exceeded 1.15, a non-magnetized phase was generated due to a large amount of Ca, whereby the saturation magnetization and the anisotropic magnetic field were reduced, which lowered the maximum energy product.

Preparation Example 7

Sintered ferrite magnets were produced in the same manner as in Preparation Example 1, except that the fine pulverization was carried out such that the particle diameter was 0.55 μm, 0.60 μm, 0.8 μm, 0.85 μm, or 0.95 μm for the composition of Sample 4 of Preparation Example 1. The maximum energy products of the sintered ferrite magnets thus obtained were measured, and the change in the maximum magnetic energy of the sintered ferrite magnets with respect to a change in the particle diameter is shown in FIG. 4.

Figure 4:
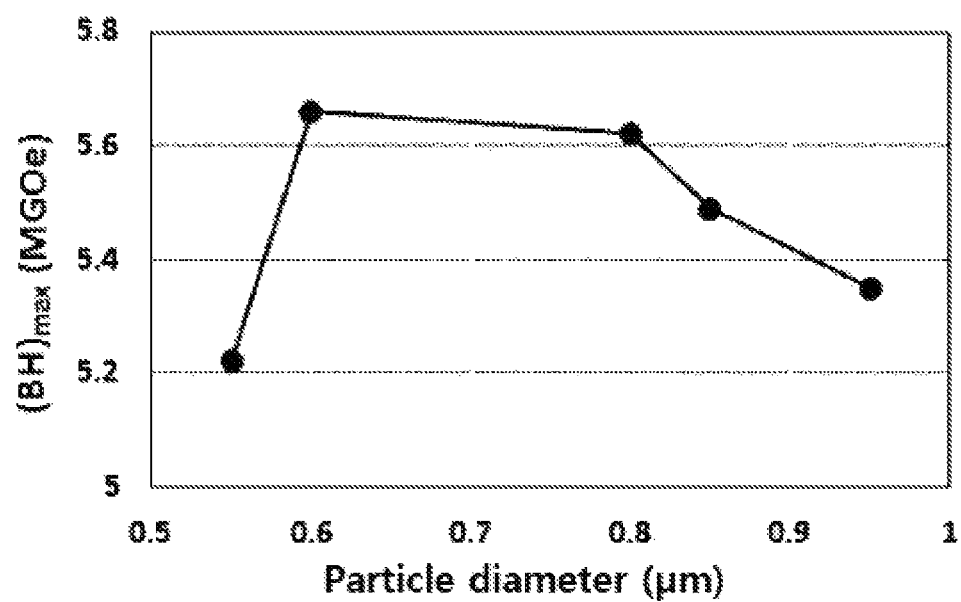
FIG. 4 is a graph showing the change in the maximum energy product with respect to a change in the particle diameter of fine powders of the sintered ferrite magnet obtained in Preparation Example 7.

As shown in FIG. 4, when the particle diameter of the fine powder was 0.55 μm, an ultrafine powder was generated, which deteriorated the dewaterability and the orientation, whereby the maximum energy product was abruptly reduced. When the particle diameter of the fine powder is 0.85 μm or more, a sufficient sintered density was not obtained, which caused such defects as a lot of pores, whereby the maximum energy product was reduced.

What is claimed is:

1. A ferrite magnetic material, which comprises a primary phase of a magnetoplumbite phase having a hexagonal structure, wherein the element constituting the primary phase comprises a composition represented by the following Formula 1:

$$Ca_{(1-x-y)}Sr_xLa_yFe_{(2n-m1-m2)}Co_{m1}Zn_{m2}O_{19} \quad \text{[Formula 1]}$$

wherein $0.335 \leq m2/m1 \leq 0.8$,
$0.25 \leq m1+m2 \leq 0.35$,
$0.92 \leq 1-x \leq 0.97$,
$1.0 \leq (1-x-y)/y \leq 1.15$,
$1.0 \leq 1-x+m2 \leq 1.1$, and
$9.0 \leq 2n \leq 10.0$.

2. The ferrite magnetic material of claim 1, which has an average particle diameter of 0.6 to 0.8 μm.

3. The ferrite magnetic material of claim 1, wherein the values of m1 and m2 satisfy the conditions of $0.3 \leq m1+m2 \leq 0.34$ and $0.6 \leq m2/m1 \leq 0.7$.

4. The ferrite magnetic material of claim 1, wherein the values of x and y satisfy the conditions of $0.95 \leq 1-x \leq 0.965$ and $1.05 \leq (1-x-y)/y \leq 1.10$.

5. The ferrite magnetic material of claim 1, wherein the values of x and m2 satisfy the condition of $1.03 \leq 1-x+m2 \leq 1.06$.

6. The ferrite magnetic material of claim 1, wherein the value of 2n satisfies the condition of $9.3 \leq 2n \leq 9.4$.

7. A sintered ferrite magnet, which is prepared by sintering the ferrite magnetic material of claim 1 and has a maximum energy product $((BH)_{max})$ of 5.6 MGOe or more, when the saturation magnetization $(4\pi Is)$ is 4.85 kG or more and the anisotropic magnetic field $(H_A)$ is 24.5 kOe or more in the first quadrant of the $4\pi I$—H curve.

8. The sintered ferrite magnet of claim 7, which has an average density of 5.1 to 5.2 g/cm³.

9. A segment-type permanent magnet derived from the ferrite magnetic material of claim 1.

10. An article comprising the segment-type permanent magnet of claim 9.

11. The sintered ferrite magnet of claim 7, wherein the ferrite magnetic material has an average particle diameter of 0.6 to 0.8 μm.

12. The sintered ferrite magnet of claim 7, wherein the values of m1 and m2 satisfy the conditions of $0.3 \leq m1+m2 \leq 0.34$ and $0.6 \leq m2/m1 \leq 0.7$.

13. The sintered ferrite magnet of claim 7, wherein the values of x and y satisfy the conditions of $0.95 \leq 1-x \leq 0.965$ and $1.05 \leq (1-x-y)/y \leq 1.10$.

14. The sintered ferrite magnet of claim 7, wherein the values of x and m2 satisfy the condition of $1.03 \leq 1-x+m2 \leq 1.06$.

15. The sintered ferrite magnet of claim 7, wherein the value of 2n satisfies the condition of $9.3 \leq 2n \leq 9.4$.

* * * * *